US006651281B1

(12) United States Patent
Figiel

(10) Patent No.: US 6,651,281 B1
(45) Date of Patent: Nov. 25, 2003

(54) SUPPORT ASSEMBLY MEANS

(75) Inventor: Jacob Figiel, Western Australia (AU)

(73) Assignee: Donjac Pty. Ltd., Dandenong (AU)

( * ) Notice: Subject to any disclaimer, the term of this patent is extended or adjusted under 35 U.S.C. 154(b) by 0 days.

(21) Appl. No.: 10/009,117

(22) PCT Filed: May 3, 2000

(86) PCT No.: PCT/AU00/00401

§ 371 (c)(1),
(2), (4) Date: Apr. 8, 2002

(87) PCT Pub. No.: WO00/66061

PCT Pub. Date: Nov. 9, 2000

(30) Foreign Application Priority Data

May 4, 1999 (AU) .............................................. PQ 0137

(51) Int. Cl.[7] ............................ A61C 7/14; A61C 7/008
(52) U.S. Cl. ................................................ 5/612; 5/607
(58) Field of Search ............................ 5/612, 613, 607, 5/608, 609, 610, 81.1 T, 88.1

(56) References Cited

U.S. PATENT DOCUMENTS

| | | | | | |
|---|---|---|---|---|---|
| 1,876,743 | A | * | 9/1952 | Pilates | 5/131 |
| 2,761,152 | A | * | 9/1956 | Pirone et al. | 5/607 |
| 3,013,281 | A | * | 12/1961 | Steiner | 5/607 |
| 3,302,219 | A | * | 2/1967 | Harris | 5/85.1 |
| 3,438,067 | A | * | 4/1969 | Saunders | 5/612 |
| 3,862,454 | A | * | 1/1975 | Mazzucconi | 5/607 X |
| 3,875,598 | A | | 4/1975 | Foster et al. | |
| 4,658,450 | A | * | 4/1987 | Thompson | 5/607 |
| 4,843,665 | A | * | 7/1989 | Cockel et al. | 5/88.1 |
| 5,018,225 | A | * | 5/1991 | Fergni et al. | 5/607 |
| 5,224,228 | A | * | 7/1993 | Larrimore | 5/607 X |
| 5,479,665 | A | * | 1/1996 | Cassidy et al. | 5/613 |
| 5,613,252 | A | * | 3/1997 | Yu et al. | 5/88.1 |
| 5,640,729 | A | * | 6/1997 | Marino | 5/607 |

FOREIGN PATENT DOCUMENTS

| | | | | | |
|---|---|---|---|---|---|
| DE | 2410414 | A | * | 9/1975 | 5/88.1 |
| DE | 3438956 | A | * | 5/1985 | 5/612 |
| EP | 0 262 771 | A1 | | 4/1988 | |
| EP | 0 374 784 | A2 | | 6/1990 | |
| EP | 0 674 893 | A2 | | 10/1995 | |
| EP | 0 955 030 | A2 | | 11/1999 | |
| FR | 1400068 | A | * | 4/1965 | 5/612 |
| GB | 2045603 | A | * | 11/1980 | 5/607 |
| WO | WO 86000221 | A | * | 1/1986 | 5/88.1 |
| WO | WO 97/30674 | | | 8/1997 | |
| WO | WO 98/11858 | | | 3/1998 | |

* cited by examiner

*Primary Examiner*—Robert G. Santos
(74) *Attorney, Agent, or Firm*—D. Peter Hochberg; Sean Mellino; Katherine R. Vieyra

(57) ABSTRACT

A bed assembly (1) for altering the position of a person supported thereon, includes a longitudinal support frame (5) having a support surface (23) for a person and a longitudinal cradle means (4) extending over the support surface. The cradle has a recess (10) extending along side portions of the cradle in the longitudinal direction. The recesses are adapted to receive and engage cradle support engaging means (7, **7*a*). These means are mounted to the support frame in close relation to the recess and adapted to be extendable and retractable in engaging relation within said recess so as to promote a change in configuration of the cradle. A first actuator (3**) is disposed beneath the support frame and coupled to the engaging means for extending or retracting the engaging means. In a first condition the actuator causes the engaging means to extend towards and be received by the recess, causing the cradle means to move between a position of rest and a concave configuration about the central longitudinal axis. In a second condition, the actuator causes the engaging means to retract, returning the cradle to the rest position. Movement between the two conditions being controlled continuously, staggered or cyclicle so as to aid movement of the person lying on the support surface.

36 Claims, 12 Drawing Sheets

5

SUPPORT ASSEMBLY MEANS

FIELD OF THE INVENTION

The invention relates to a support assembly means which support means is adapted to conform to a range of configurations. In particular the present invention relates to a support assembly means for supporting a body held thereon in a range of different positions. Even more particularly the support assembly means finds specific application in relation to treatment of long term bed ridden patients.

BACKGROUND OF THE INVENTION

There are many problems faced by long term bed ridden patients substantially incapable of supporting their own movement. Persons who stay in contact with bed support for long periods of time are prone to suffer from poor blood circulation and decubitus ulcers (bed sores) as a result of a generally immobile condition. Generally patients falling into this category have required in the past significant and repeated attention by hospital staff, person carers or relatives so as to avoid lying or sitting in a single position for extended periods of time.

Problems have often been exacerbated due to low hospital staffing levels and therefore failure to provide adequate frequency of patient position change. Even further difficulties are experienced when such adequate frequency of change requires disturbance of a patient day and night and labour intensity associated with frequent physical lifting of patients generally undertaken by nursing staff. Particular occupational health and safety problems have been highlighted when repeated heavy lifting is required.

There have been many attempts in the prior art to address the above problems. For example in GB 2045603 there is disclosed a bed in which a patient can be supported by an open net mesh which is attached across a support frame, which is in turn supported by a base frame. The support frame consists of two spaced parallel longitudinal members which are adapted to fold inwards thus providing the net mesh to support a patients weight. The means by which a patient is rolled comprises a combination of tilting the support frame and tensioning the mesh net at various points, depending on what part of a patients body the net is supporting. This type of bed is somewhat clumsy and requires presence of nursing staff so as to appropriately apply tension to the mesh net during the course of operating the bed.

In EP 262771 there is disclosed a sub-bed mattress assembly adapted to roll a patient. The sub-bed mattress consists of two leafs divided longitudinally and overlaying a respective lateral portion of a supporting base connected by hinges. There is disposed beneath each leaf bladders for independently raising each leaf so as to roll a bed occupant. When one bladder is inflated the overlaying mattress portion is raised and the whole mattress moved sideways so that a person lying thereon is correspondingly rolled. This system is again cumbersome, expensive and cannot be used to form a cradle configuration. In this prior art there is inevitably a risk of a patient rolling out of the bed.

Other prior art such as that described in U.S. Pat. No. 3,875,598, while a cradle type configuration is adopted, in order for rocking motion to commence so as to roll a patient some patient motion is required to initiate rocking movement. In addition the cradle configuration is attained by providing multiple hinges, collapsing spring assemblies and telescoping components, which add to the complexity of this apparatus.

It is known that a conventional hospital bed can adopt a variety of positions found to be useful for aiding treatment or improving comfort of persons suffering certain medical conditions. The following positions for example the trendelenberg 15°, reverse trend 15°, cardiac chair, vascular and posture relaxation are known to persons skilled in the art. A conventional hospital bed can be raised or lowered for convenience in any of the above positions, and can be tilted to some extent with difficulty.

The applicant has found that prior art means of turning patients have suffered the drawback of not being able to do so in all available conventional positions. There has, as previously mentioned, therefore been a long felt need to address this problem so as to provide a means of turning a patient in any combination of desired bed positions.

The present invention intends to ameliorate at least one of the above disadvantages.

SUMMARY OF THE INVENTION

There has been a long felt need in this art to provide an efficient and cost effective means of improving patient care and quality of life for long term immobile bed ridden patients.

Accordingly the present invention provides in a first aspect a bed assembly for altering the position of a person supported thereon including:

a longitudinal support frame having a support surface for receiving a person thereon;

a longitudinal cradle means extending over the support surface, the cradle means being attached to the support surface substantially along a central axis in the longitudinal direction thereof, the cradle means further incorporating a recess extending along side portions of the cradle means in the longitudinal direction thereof adapted for receiving and engaging an engaging means;

a cradle support engaging means mounted to the support frame in close relation to said recess adapted to be extendable and retractable in engaged relation within said recess along said longitudinal side portions of said cradle means so as to promote change in configuration of said cradle means;

a first actuator mechanism disposed beneath the support frame in physical coupling relation to the engaging means for extending or retracting the engaging means;

wherein in a first condition the first actuator means causes the engaging means to extend towards and be received by said recess extending along said longitudinal side portions of the cradle means, thereafter causing the cradle means to move, in positive engagement with the engaging means, with extending movement of the engaging means between a position of rest and a substantially concave configuration about the central longitudinal axis of the support surface and in a second condition the first actuator means causes the engaging means to retract so as to correspondingly promote movement of the cradle means from said substantially concave configuration to said resting position conforming with the support surface, the change in configuration of the cradle means between said first and second condition being controllably continuous, staggered or cyclicle so as to aid movement of a person lying on said support surface.

In a second aspect of the invention there is disclosed a bed assembly for altering the position of a person supported thereon including:

a longitudinal support frame having a support surface for receiving a person thereon;

a base support on which the support is centrally pivotally mounted;

a longitudinal cradle means extending over the support surface, the cradle means being attached to the support surface substantially along a central axis in the longitudinal direction thereof, the cradle means further incorporating a recess extending along side portions of the cradle means in the longitudinal direction thereof adapted for receiving and engaging an engaging means;

a cradle support engaging means mounted to the support frame in close relation to said recess adapted to be extendable and retractable in engaged relation within said recess along said longitudinal side portions of said cradle means so as to promote change in configuration of said cradle means;

a first actuator mechanism disposed beneath the support frame in physical coupling relation to the engaging means for extending or retracting the engaging means;

a second actuator mechanism coupled between the base support, and longitudinal support frame for promoting independent pivot movement of the support frame about its longitudinal central axis;

wherein in a first condition the first actuator means causes the engaging means to extend towards and be received by said recess extending along said longitudinal side portions of the cradle means, thereafter causing the cradle support to move in positive engagement with the engaging means, with extending movement of the engaging means between a position of rest and a substantially concave configuration about the central longitudinal axis of the support surface and in a second condition the first actuator means causes the engaging means to retract so as to correspondingly promote movement of the cradle means from said substantially concave configuration to said resting position conforming with the support surface, the change in configuration of the cradle support means between said first and second condition being controllably continuous, staggered or cyclicle;

and the second actuator mechanism is able to act upon the support frame so as to promote tilting movement thereof to one side or the other about the longitudinal axis of the support frame;

the change in configuration of the cradle means being independent of the tilting movement of the support frame so as to aid movement of a person lying thereon.

It has been found by the applicant that a person lying on the bed assembly of the invention is able to be moved by the change in configuration of the cradle means. Because the configuration of the cradle means is able to change either continuously or incrementally, the applicants have also found that a body can be moved with less manual physical labour intervention. The applicant has also found that the cradle means enables turning of patients in all known conventional bed positions.

PREFERRED ASPECTS OF THE INVENTION

The present invention finds particular application to hospital beds, in particular for aiding movement of informed, invalid or bedridden patients incapable of moving themselves.

Preferably the cradle means is a sheet type material having a recess on each side portion said recess extending in a longitudinal direction thereof.

Preferably the sheet material is selected from thermoplastic or thermosetting plastics. More preferably the material is a acrylomitrilebutadiene-styrene copolymer.

Preferably the cradle means can be a single continuous sheet or can be a series of sheet sections adapted to correspond to divided sections of a support frame.

Preferably the cradle means has a series of slots evenly spaced extending in a direction transverse to the longitudinal axis.

The purpose of such slots is to improve the flexibility of the sheet and its ability to contour so as to better support various body parts during turning. It is found by the applicant that depending on the position of the patients body on the sheet, certain parts of the sheet will be under tension by virtue of weight distribution of a patient supported thereon, while other parts may remain loose.

Preferably a central portion of the cradle means extending longitudinally along the support frame is securably attached to the support frame by means of screwing to the frame or by using a system of valcro.

Preferably the cradle means can further have a mattress placed thereon.

Preferably the cradle support engaging means is a frame structure disposed beneath and extending across said support frame.

Preferably the frame structure includes a set of raising arms adapted to be extendable and retractable when said engaging means is acted upon by said first actuator mechanism.

Preferably the raising arms are cantilevered so as to adopt a first folded position adjacent longitudinal sides of the support frame when retracted and a second perpendicular position with respect to the support surface when extended.

Preferably the frame includes a pair of engagement transmission bars positioned on either side of the support frame and coupled to the raising arms so as to be raised and lowered with extended and retracted movement of the raising arms respectively.

Preferably the raising arms and transmission bars are able to be moved in unison.

Preferably the support frame is divided into a plurality of sections or plates.

More preferably the support frame has at least two sections, most preferably there are three sections or plates adapted to be independently slidably or pivotally movable so as to be capable of adopting any number of conventional positions including for example a reclining position and other positions mentioned previously.

Preferably the support frame can be pivotally adjusted about a vertical plane passing through its centrally located longitudinal axis.

Preferably the base support can be raised or lowered or tilted about a vertical axis.

Preferably the first and second actuator means is a piston operated hydraulically or by compressed air or electronically. More preferably the actuator means can be operated by a remote sensor device.

Preferably the actuator means can be continuously operable. In this way the movement of the cradle support means can be performed with the support frame and base support in any desired combination of positions.

The applicants have found that the bed assembly of the present invention can effectively and efficiently support a body up to a weight of about 150 kg. The applicants present invention is capable of continuous or intermittent independent actuation of side arms and rocking motion by means of a first and second actuator respectively. This means that a body being supported by the present invention can be turned repeatedly while passing through a central origin point. Turning of a patient can also be conducted while the support frame is inclined at any angle to the base frame or at any predetermined height. In particular an advantage of the present invention is its capability of turning a patient with the bed in any desired combination of positions.

Specific embodiments of this invention will now be described by way of non-limiting example.

INTEGER LIST

Figure 1:
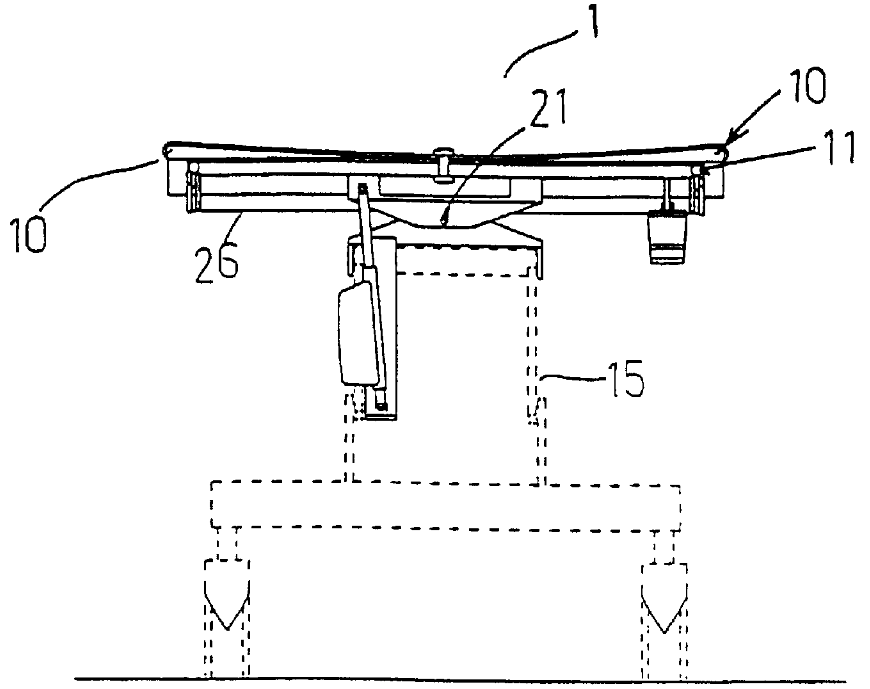
FIG. 1 represents an end view of the support assembly in a flat horizontal position.

1. Bed assembly
2. Short lever arm
3. First actuator mechanism
4. Cradle support engaging frame
5. Support frame
6. First actuator
7. Raising arm
7*a*. Second raising arm
8. Sheet
9. Securing means
10. Folded recess of sheet
12. Second actuator mechanism
14. Mattress
15. Base frame
19. Transmission bar
20. Sections of support surface
21. Pivotal attachment
22. Second end of raising arm
23. Support surface
24. Pivot connection point
25. Second actuator
26. First transverse axle

DETAILED DESCRIPTION OF THE PREFERRED EMBODIMENT WITH REFERENCE TO THE DRAWINGS

Figure 2:
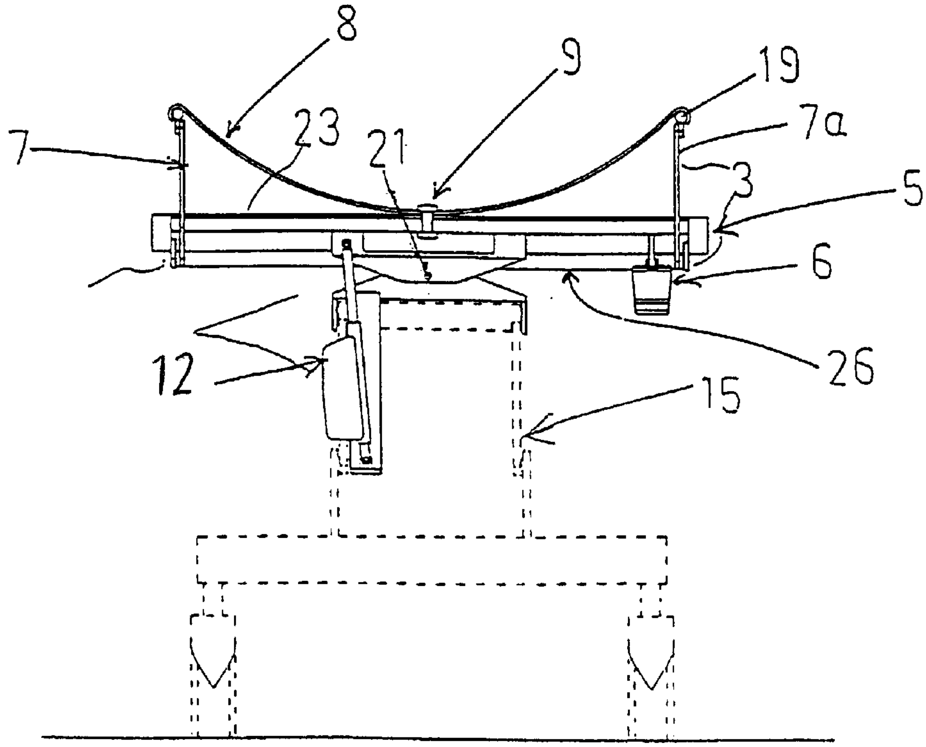
FIG. 2 represents an end view of the support assembly showing the sheet in cradle configuration.
Figure 9:
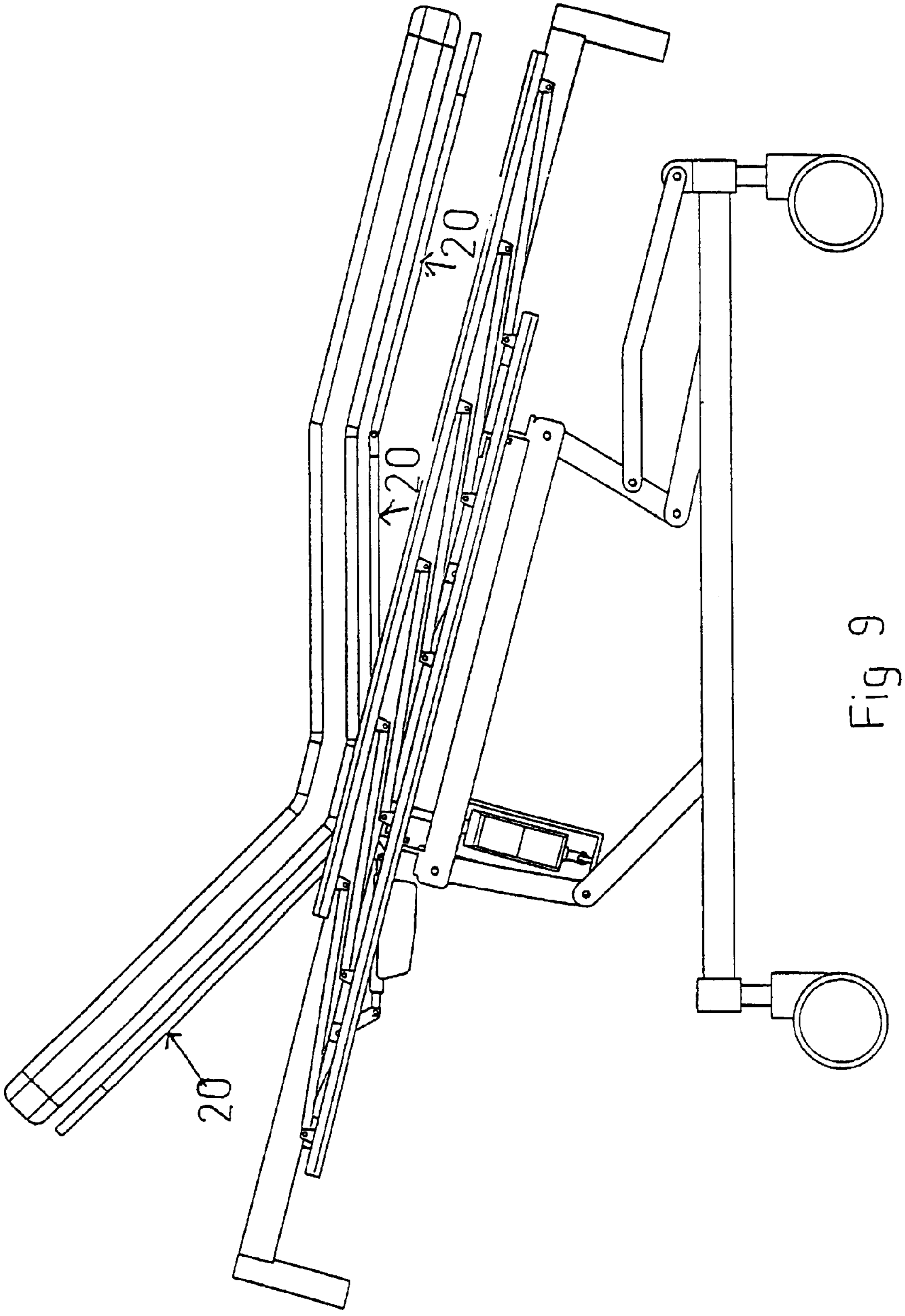
FIG. 9 is a side view of a support assembly in a reclined angled forward position.
Figure 10:
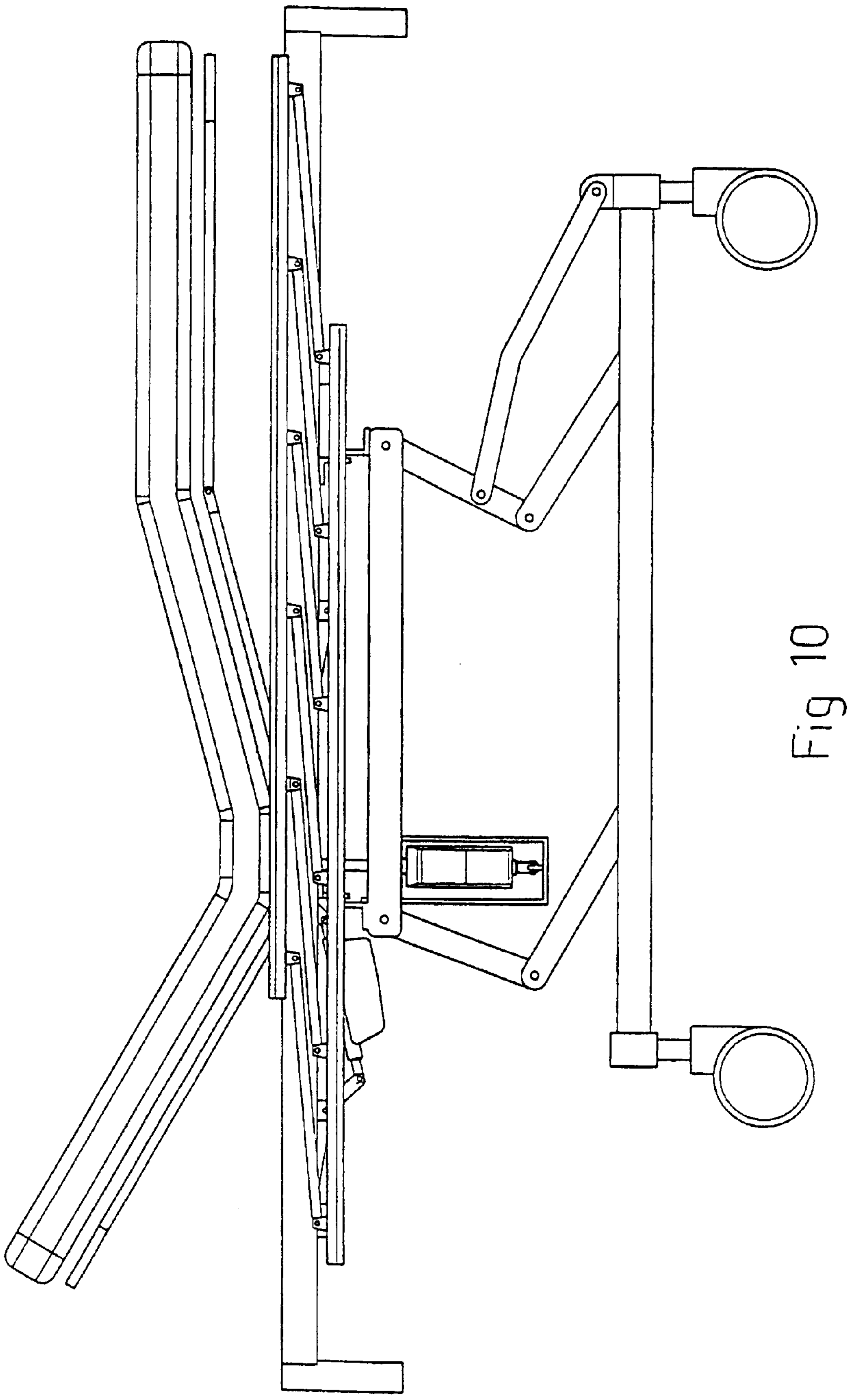
FIG. 10 is a side view of a support assembly in a reclined h horizontal position.
Figure 11:
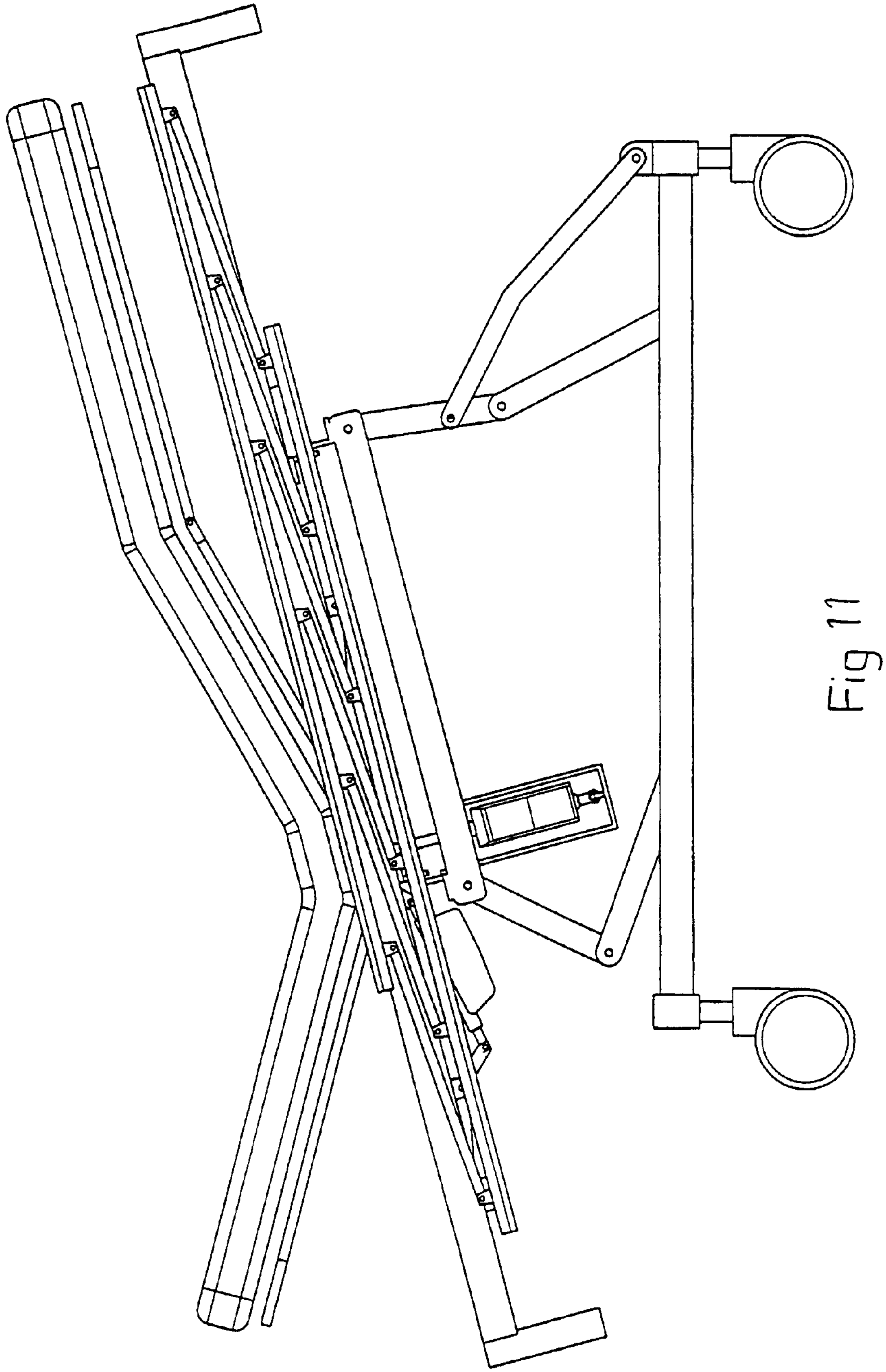
FIG. 11 is a side view of a support assembly in a reclined angled backward.
Figures 12, 13, 14, 15:
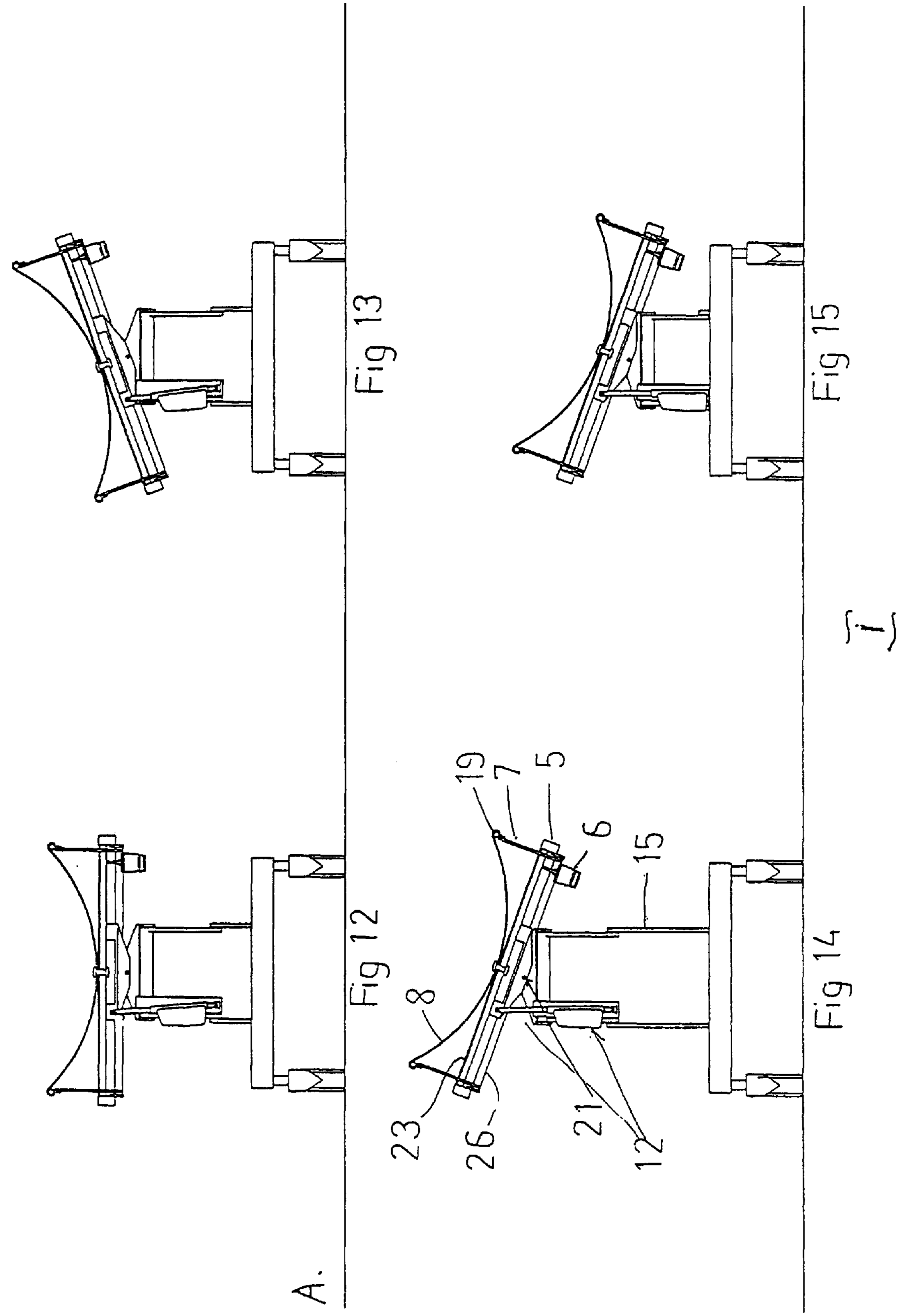
FIGS. 12, 13, 14 and 15 represent an end view of the support assembly which shows the support frame in a number of tilting positions each with the sheet engaged in a cradle configuration.
Figure 17:
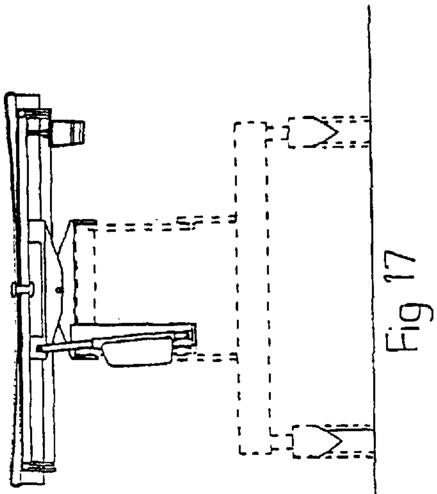
FIG. 17 is an end view of FIG. 16.

With reference to FIGS. 1 and 2 there is shown an end view of a bed assembly (1) of the invention. The bed assembly comprises a base frame (15) which provides pivotal attachment support at pivot point (21) for a generally rectangular support frame (5). The support frame (5) has a support surface (23) on which a body may be positioned. The support surface incorporates at least two preferably three sections or plates (20) (shown in FIG. 9) which can be moved independently into a variety of positions. For example in FIG. 9 there is shown a support frame incorporating three sections (20) which sections are pivotally and lockably moveable in relation to the support frame. A reclining position is represented in FIG. 9.

Also shown in FIGS. 1 and 2 is an ABS flexible sheet (8) securely attached to the support frame along a central point in a longitudinal direction by securing means (9) illustrated as a nut and bolt combination.

There is shown in FIG. 2 a clear end view representation of raising arms (7) in raised position with elongate longitudinal transmission bars (19) attached thereto, the transmission bars are shown in engagement arrangement with folded recess (10). of flexible sheet (8) so as to form a concave configuration. In FIG. 1 raising arms (7) are shown in a lowered arrangement in folded relation to support frame (5). In this condition the cradle support sheet conforms to the support surface (23) of the support frame (5).

Figure 3:
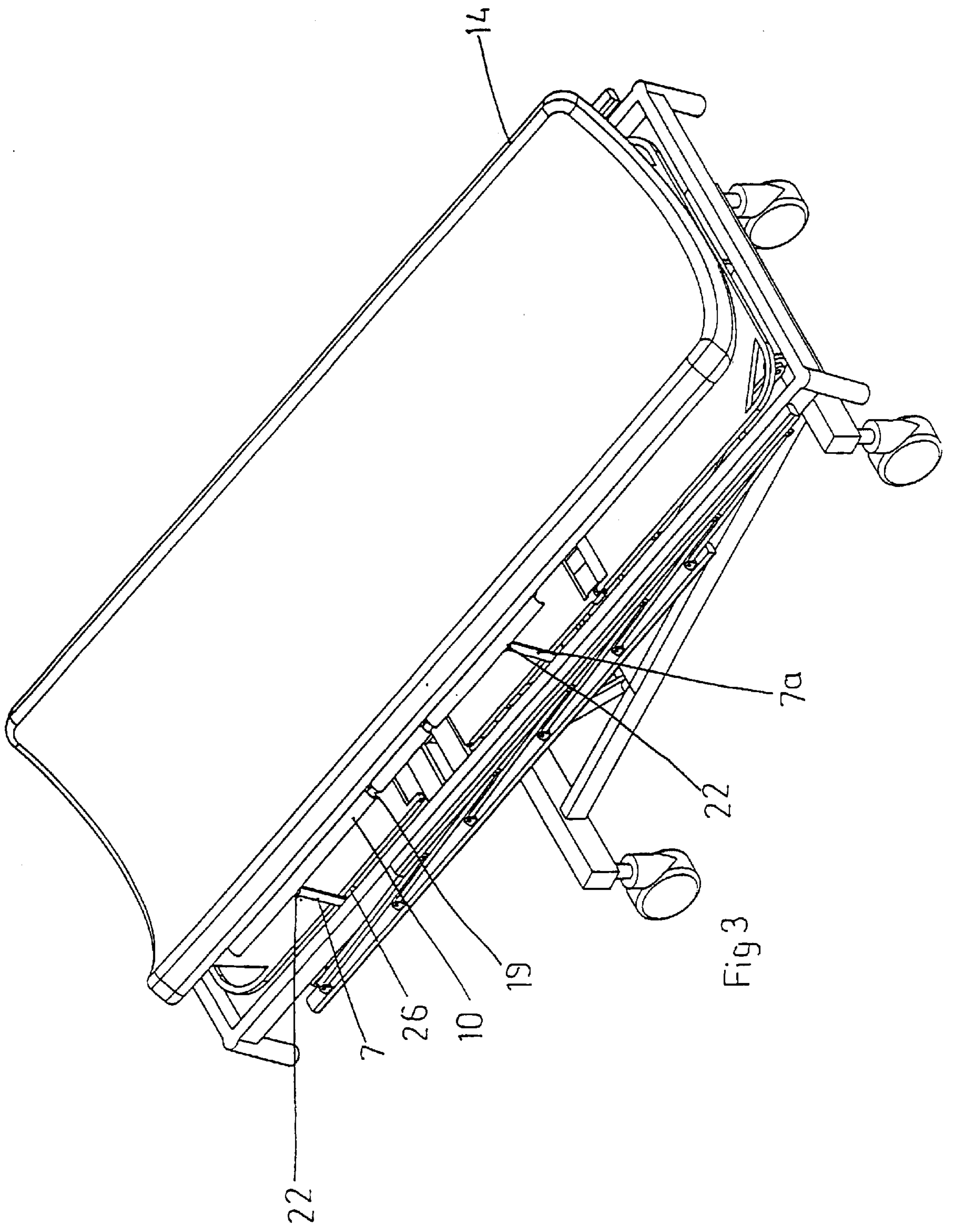
FIG. 3 represents a schematic view of the support assembly having disposed on the sheet a mattress in cradle configuration conforming to the contour of the sheet.
Figure 16:
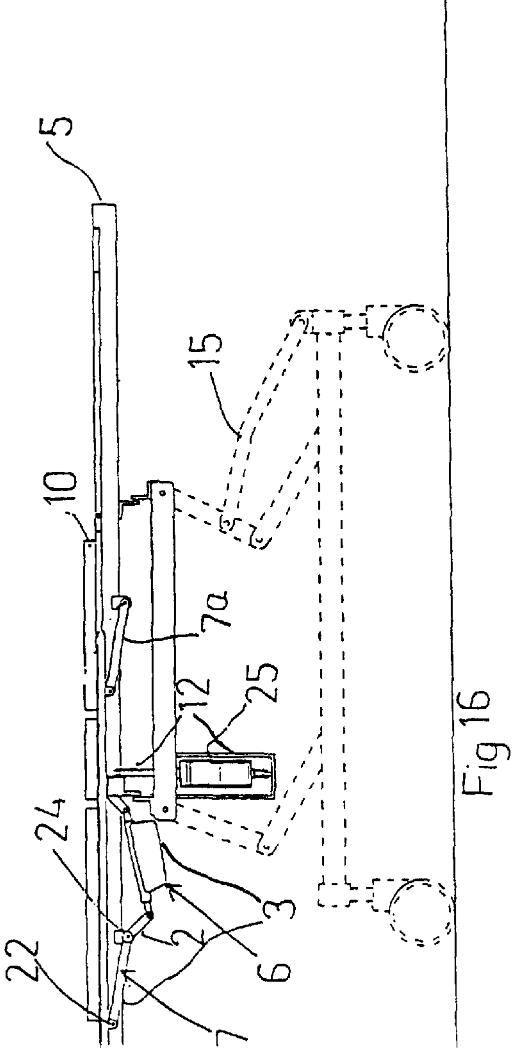
FIG. 16 shows a side view of the support assembly with support frame and sheet in horizontal and flat configuration respectively.
Figure 18:
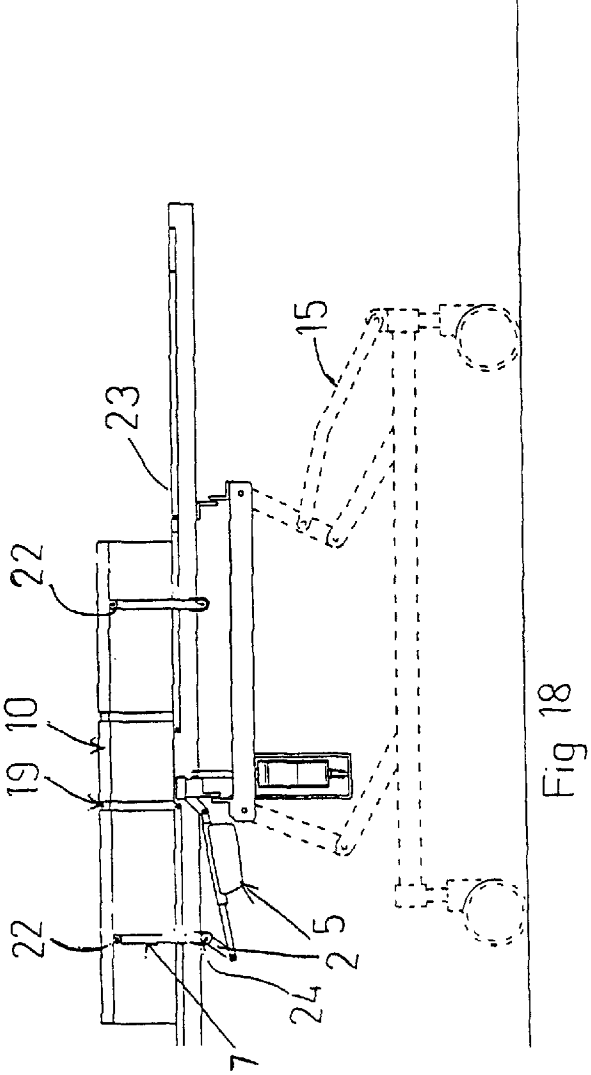
FIG. 18 is a side view of the support assembly as in FIG. 16 with the sheet being engaged in cradle configuration.

There is shown clearly in FIGS. 3, 16 and 18 two raising arms (7) and (7a) which are securely attached at a first end (22) to an elongate longitudinal transmission bar (19) and pivotally attached at the other end (24) to a transverse cross member (26) extending across and beneath the support frame (5) to be pivotally attached to a corresponding raising arm (7). The transmission bar (19) is represented engaging the recess folds (10) of the ABS sheet.

A specific embodiment of the bed assembly is shown in reference to FIGS. 16 to 20.

FIGS. 16 and 18 illustrate a side view of the bed assembly (1) of the preferred embodiment fitted with a cradle sheet (8), a cradle support engaging frame (4) and a cradle support engaging frame raising mechanism (3).

It is to be understood that some of the components of the bed assembly have been removed for the purposes of illustrating with clarity the mechanism for achieving a change in configuration of the cradle support sheet.

In a first condition shown in FIG. 16 the cradle support sheet (8) is supported in a flat horizontal arrangement on the supporting surface (23) of the bed assembly (1). In this condition the recessed folds (10) of the cradle support sheet (8) rest on the support surface in non-engaged relation with and adjacent to longitudinal transmission bars (19). In order to raise the cradle sheet (8) from the flattened position, a first actuator mechanism (3) is bounded between the support frame (5) and cradle support engaging frame (4).

The first actuator mechanism (3) comprises an electric actuator (6) such as an electric screw motor which when activated enables extension and retraction of an extended arm. The extendable/retractable arm is coupled at one end of a short lever arm (2). The other end of lever arm (2) is pivotally coupled to the bottom edge of support frame (5) at pivot connection point (24) and the raising arm (7) is fastened at a first end to pivot together with short lever arm (2) at pivot point (24). A transverse axle (26) is also connected at the pivotal connection point (24) extending across and underneath the support frame to join corresponding sets of components so as to enable the first electric actuator (6) to drive both sets of components through short lever arm (2).

The second end (22) of raising arm (7) is connected to a longitudinal transmission bar (19) which in turn is adapted to be received within the recess (10) of the cradle sheet (8). As shown the cradle support engaging frame (4) includes a second raising arm (7*a*) spaced apart from the first lever arm (7) and connected to a corresponding lever arm via a second transverse axle (not shown). The upper ends (22) of both lever arms (7) and (7*a*) are connected to the transmission bar (19).

As shown in FIG. 16, when the actuator (6) is in a retracted position the cradle support sheet (8) lies in a flat and horizontal condition with pivotable arms (7) and transmission bar (19) positioned adjacent to longitudinal edges of the support frame (5).

As the actuator (6) is extended, the lever arms (7) and (7*a*) are acted upon by short lever arm (2) so as to cause the lever arms (7, 7*a*) and transmission bar (19) connected thereto to be moved and raised in unison.

Figure 6:
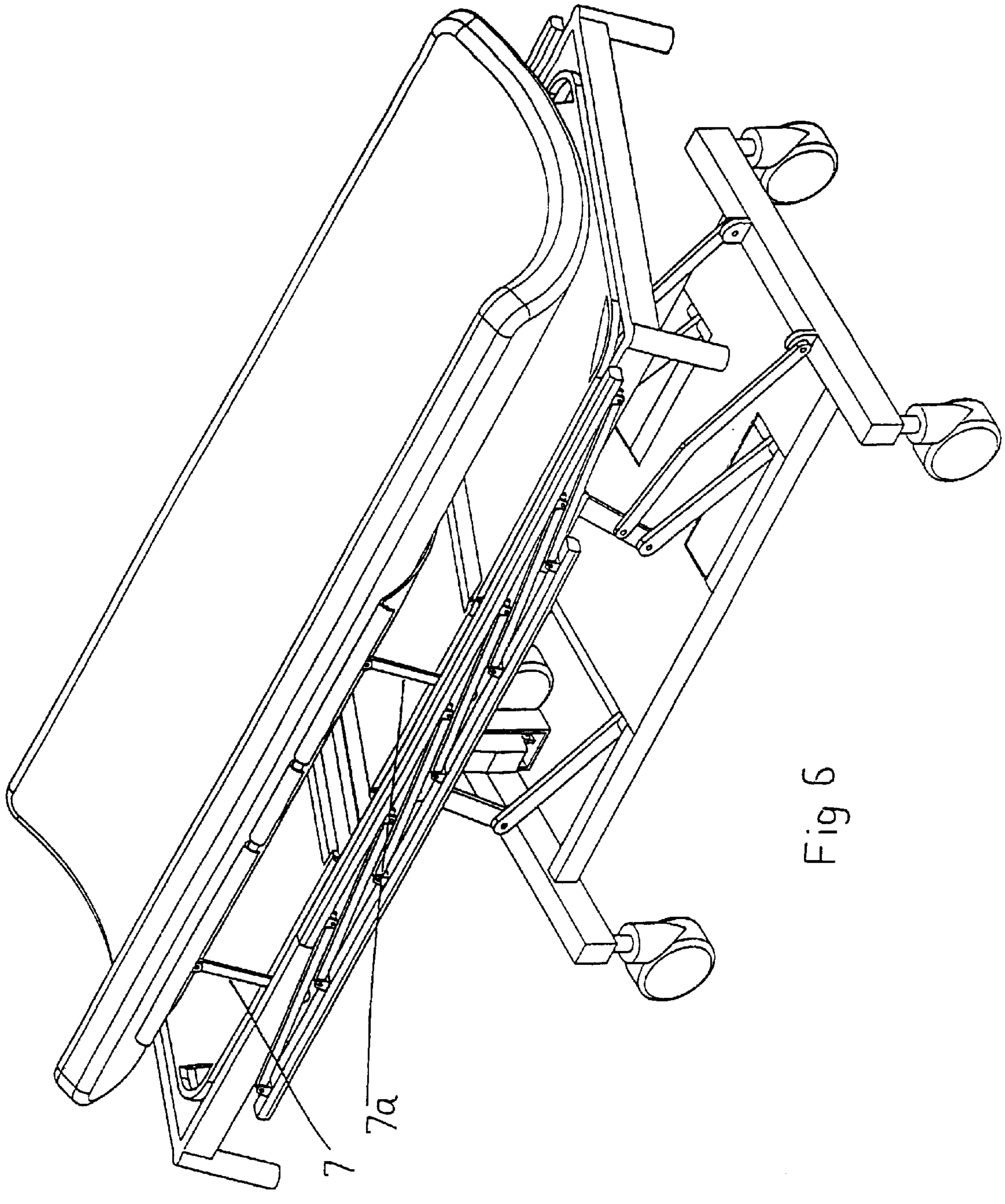
FIG. 6 represents a schematic view of the support assembly in a slightly inclined position with the sheet in cradle configuration.
Figure 7:
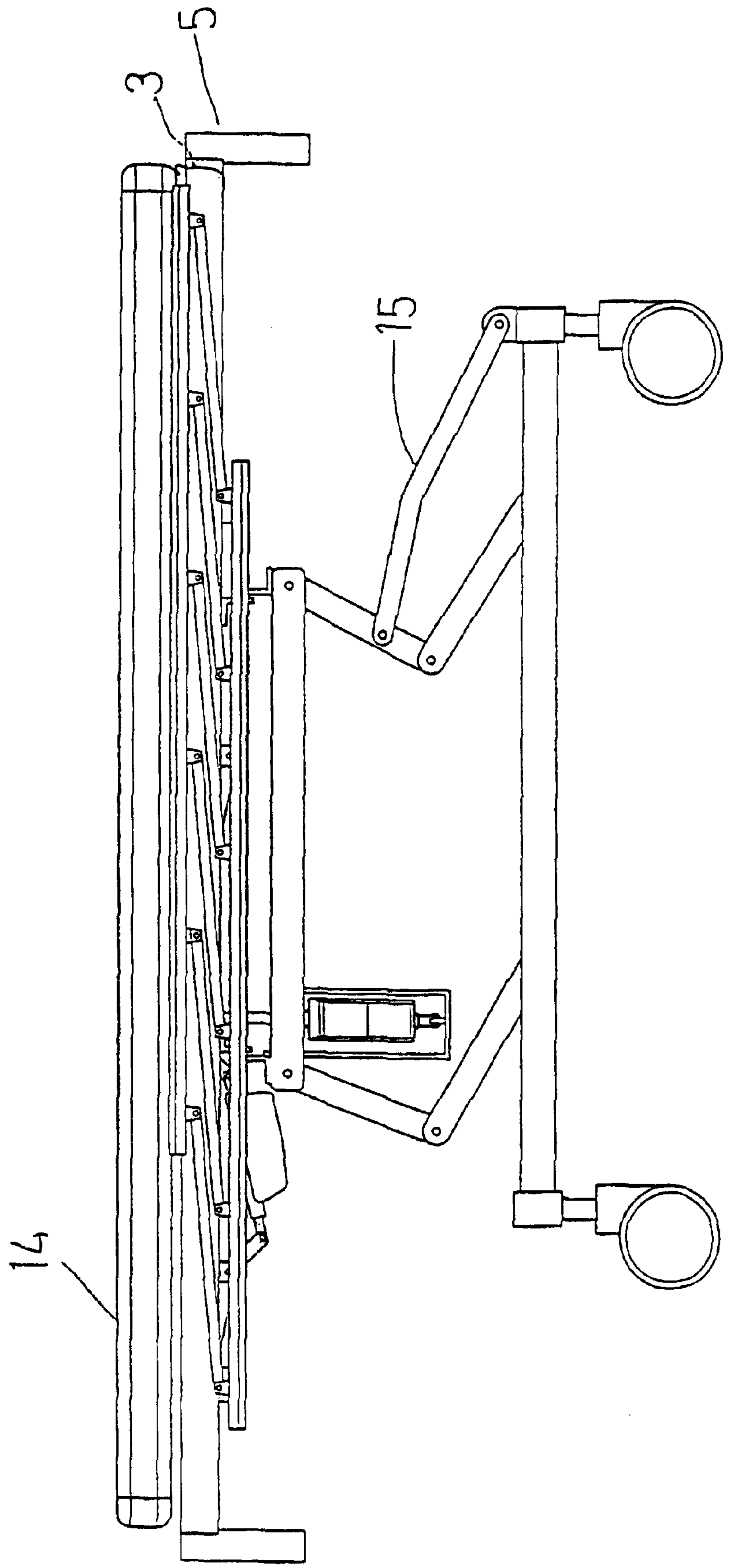
FIG. 7 represents a schematic side view of the support assembly in a flat horizontal position.
Figure 8:
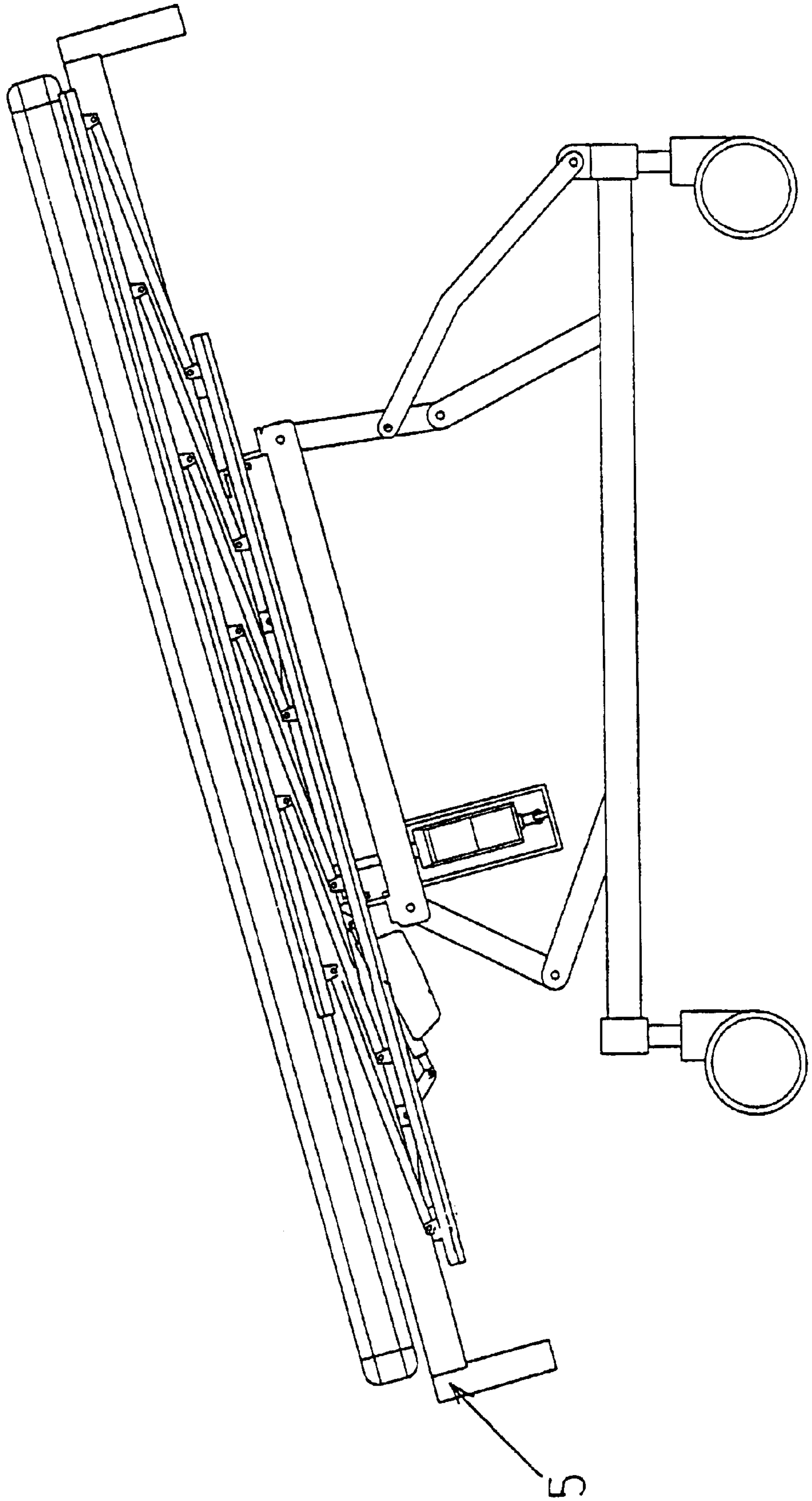
FIG. 8 represents a schematic view of the support assembly in a inclined position.
Figure 19:
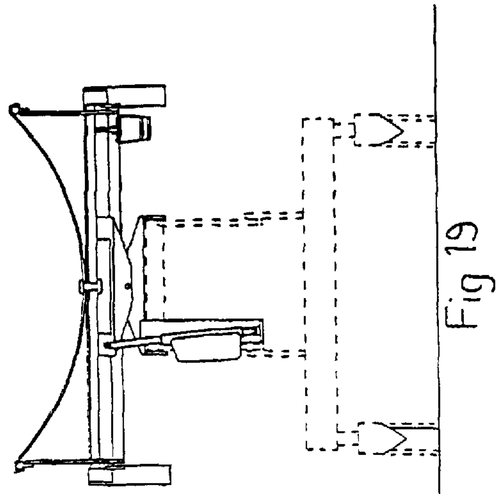
FIG. 19 is a rear view of FIG. 18.

As can be seen in FIG. 18, in raised condition, the lever arms (7, 7*a*) have adopted a perpendicular orientation relative to the support surface enabling the transmission bar (19) to be raised and received in engaged relation within the recess folds (10) of the cradle support sheet (8). As a result the configuration of the cradle means (8) is altered between a flattened position and a symmetrical concave orientation. The concave orientation is best seen in FIGS. 2, 6 and 19.

The first actuating means (6) can be adapted to continuously or incrementally extend or retract so that movement of the longitudinal bar can cycle through a variety of positions during the course of engagement and disengagement of sheet (8). In this way the sheet can adopt a variety of configurations depending on the tension applied to it by the extent of engagement with the longitudinal transmission bar.

In FIGS. 12, 13, 14 and 15 there is shown in end view the support assembly with sheet (8) adapted to be in concave cradle configuration, in various filting positions, and in various height adjusted positions. The tilting of said support frame is achieved by a second actuator mechanism (12) which is disposed underneath said support frame and within the base support (15). The second actuator mechanism comprises an actuator (25) shown with an extendable/retractable piston arm attached to the support frame (5) at pivot point (21). Tilting or rocking motion is caused by the second actuator by means of the piston arm either extending or retracting, causing the support frame (5) to pivot in relation to the base support at pivot point (21).

The second actuating means can be adapted to continuously or incrementally cause pivotal movement of the support frame in relation to the support base.

Figure 4:
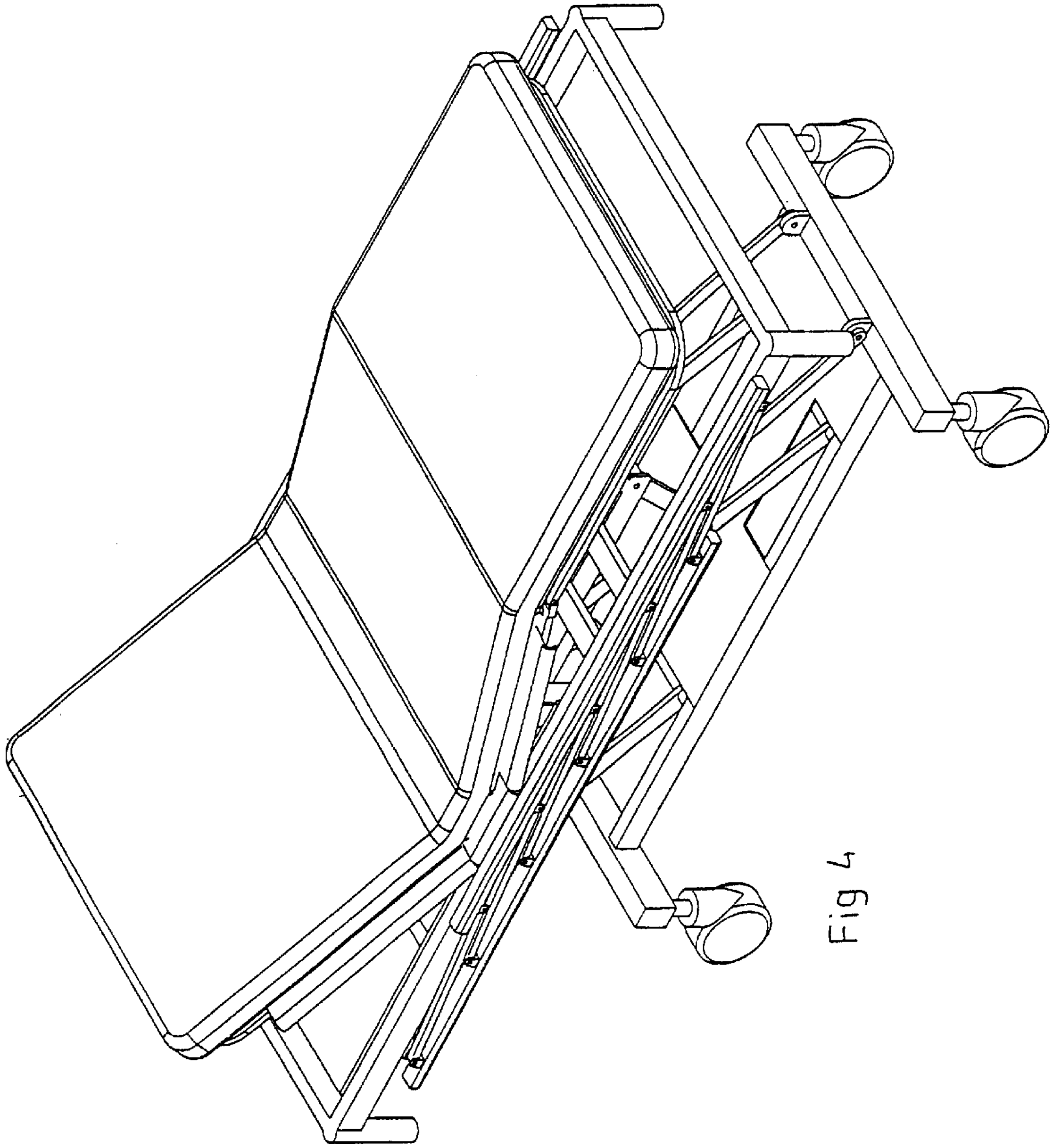
FIG. 4 represents a schematic view of the support assembly in a reclined position.
Figure 5:
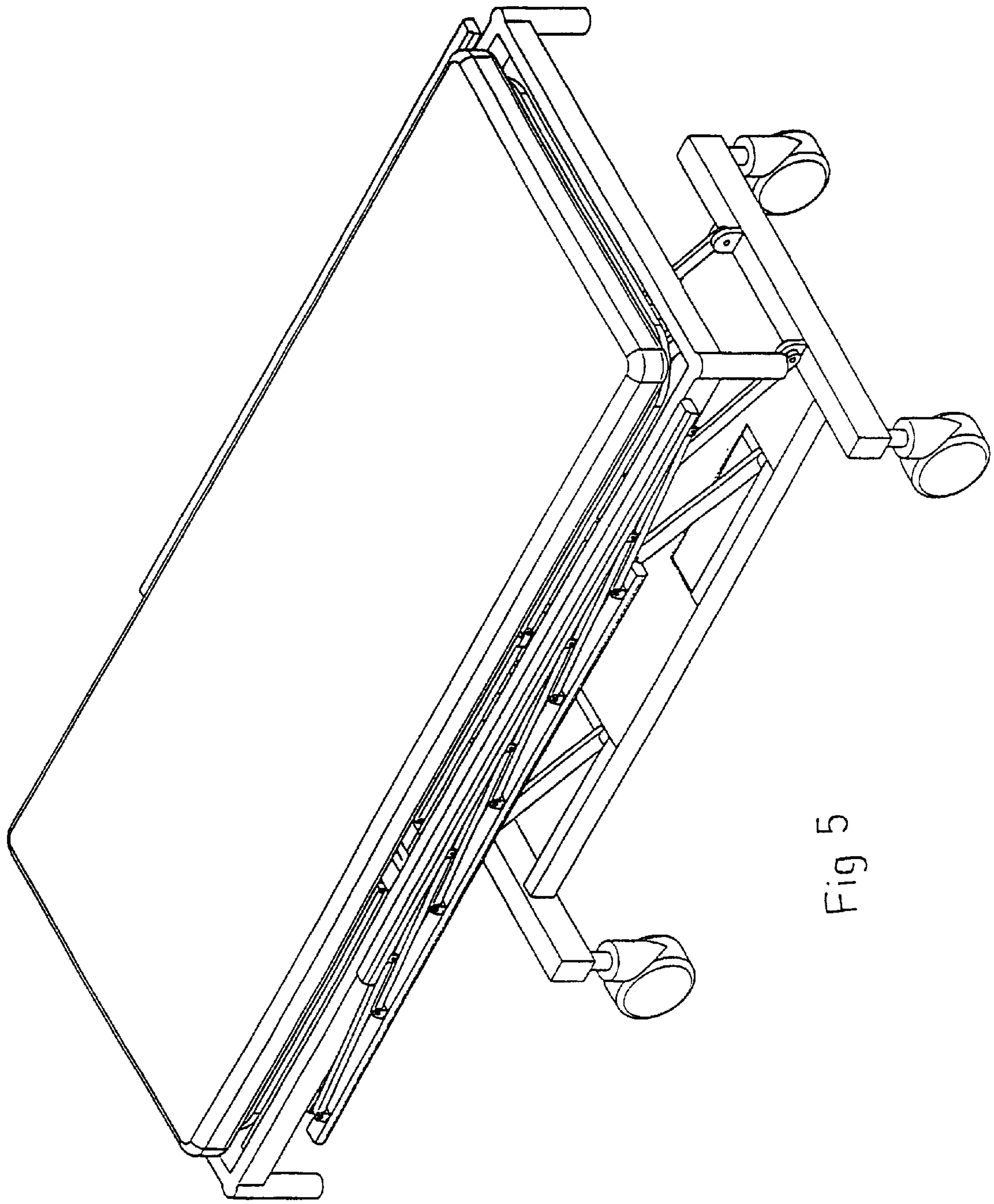
FIG. 5 represents a schematic view of the support assembly in a flat horizontal position.

A further advantage of the present invention not shown in the diagrams is that the cradle configuration of the cradle sheet can be adopted when the sections of the support frame are in gentle reclining position. FIG. 4 shows three sections of the support frame in gentle reclining position.

The height of the support assembly can be varied by conventional adjustments to the base support (15). The base support is conventionally adapted to enable the support frame to be tilted at an angle about its transverse central axis.

FIGS. 5 to 11 show the bed assembly of the invention in a range of readily achievable positions and combinations of positions. In each of these positions a mattress (14) is illustrated conforming to the configuration of the support surface and cradle sheet so as to provide movement of a person lying thereon without the need for excessive labour.

The claims, illustrations, photographs and drawings, if any, form part of the disclosure of this specification as does the description, claims, illustrations, photographs and drawings of any associated provisional or parent specification or of any priority document, if any, all of which are imported hereinto as part of the record hereof.

Finally it is to be understood that various alterations, modifications and/or additions may be incorporated into the various constructions and arrangements or parts without departing from the spirit and ambit of the invention.

The claims defining the invention are as follows:

1. A bed assembly for altering the position of a person supported thereon including:

a longitudinal support frame having a support surface for receiving a person thereon;

a longitudinal cradle means extending over the support surface, the cradle being attached to the support surface substantially along a central axis in the longitudinal direction thereof, the cradle further incorporating a recess extending along side portions of the cradle and above the support surface in the longitudinal direction thereof, said recess being adapted for receiving and engaging a cradle support engaging means;

said cradle support engaging means being mounted to the support frame in close relation to said recess said engaging means being extendable and retractable in engaged relation within said recess along said longitudinal side portions of said cradle to promote change in configuration of said cradle;

a first actuator mechanism disposed beneath the support frame in physical coupling relation to the engaging means for extending or retracting the engaging means;

wherein, in a first condition, the first actuator mechanism causes the engaging means to extend towards and be received by said recess extending along said longitudinal side portions of the cradle thereafter causing the cradle means to move, in positive engagement with the engaging means, with extending movement of the engaging means between a position of rest and a substantially concave configuration about the central longitudinal axis of the support surface, and, in a second condition, the first actuator mechanism causes the engaging means to retract to correspondingly promote movement of the cradle from said substantially concave configuration to said resting position conforming with the support surface, the change in configuration of the cradle between said first and second condition being controllably continuous, staggered or cyclical so as to aid movement of a person tying on said support surface.

2. A bed assembly according to claim 1 wherein the cradle is a sheet type material having a recess on each side portion said recess extending in a longitudinal direction thereof.

3. A bed assembly according to claim 2 wherein the sheet material is selected from the group consisting of thermoplastic and thermosetting plastics.

4. A bed assembly according to claim 3 wherein the sheet material is a acrylonitrilebutadiene-styrene copolymer.

5. A bed assembly according to claim 1 wherein the cradle is selected from the group consisting of a single continuous sheet and a series of sheet sections adapted to correspond to divided sections of a support frame.

6. A bed assembly according to claim 1 wherein the cradle has a series of slots evenly spaced extending in a direction transverse to the longitudinal axis.

7. A bed assembly according to claim 1 wherein a central portion of the cradle extending in a longitudinal direction is securably attached to the support frame by at least one of screwing to the frame and using a system of hook and loop fasteners.

8. A bed assembly according to claim 1 wherein the cradle further includes a mattress placed thereon.

9. A bed assembly according to claim 1 wherein the cradle support engaging means is a frame structure disposed beneath and extending across said support frame.

10. A bed assembly according to claim 9, wherein the frame structure includes a set of raising arms adapted to be extendable and retractable when said first actuator mechanism acts upon said engaging means.

11. A bed assembly according to claim 10 wherein the raising arms are cantilevered to adopt a first folded position adjacent longitudinal sides of the support frame when retracted and a second perpendicular position with respect to the support surface when extended.

12. A bed assembly according to claim 10 wherein the frame structure further includes a pair of engagement transmission bars positioned on either side of the support frame and coupled to the raising arms to be raised and lowered with extended and retracted movement of the raising arms respectively.

13. A bed assembly according to claim 11 wherein the raising arms and transmission bars are moveable in unison.

14. A bed assembly according to claim 1 wherein the support frame is divided into a plurality of sections or plates.

15. A bed assembly according to claim 14 wherein the support frame has at least two sections adapted to be independently slidably or pivotally movable to be capable of adopting any number of conventional positions.

16. A bed assembly according to claim 1 wherein the support frame can be pivotally adjusted about an imaginary vertical plane passing through its centrally located longitudinal axis.

17. A bed assembly according to claim 1 wherein the base support can be at least one of raised, lowered, and tilted about a vertical axis.

18. A bed assembly for altering the position of a person supported thereon including:

a longitudinal support frame having a support surface for receiving a person thereon, a base support on which the support frame is centrally pivotally mounted;

a longitudinal cradle extending over the support surface, the cradle being attached to the support surface substantially along a central axis in the longitudinal direction thereof, the cradle further incorporating a recess extending along each side portion of the cradle in the longitudinal direction adapted for receiving and engaging an engaging means;

a cradle support engaging means extendably mounted to the support frame in close relation to said recess adapted to be extendable and retractable in engaged relation within said recess along said side portions to promote change in configuration of said cradle;

a first actuator mechanism disposed beneath the support frame in physical coupling relation to the engaging means for extending or retracting the engaging means;

a second actuator mechanism coupled between the base support and longitudinal support frame for promoting independent pivot movement of the support frame about its longitudinal central axis;

wherein, in a first condition, the first actuator mechanism causes the engaging means to extend towards and be received by said recess extending along said side portions, thereafter causing the cradle to move in positive engagement with the engaging means, with extending movement of the engaging means between a position of rest and a substantially concave configuration about the central longitudinal axis of the support surface, and, in a second condition, the first actuator mechanism causes the engaging means to retract to correspondingly promote movement of the cradle from said substantially concave configuration to said resting position conforming with the support surface, the change in configuration of the cradle between said first and second condition being controllably continuous, staggered or cyclical; and the second actuator mechanism is able to act upon the support frame to promote tilting movement thereof to one side or the other about the longitudinal axis of the support frame, the change in configuration of the cradle being independent of the tilting movement of the support frame to aid movement of a person lying thereon.

19. A bed assembly according to claim 18 wherein the first and second actuator mechanism is a piston operated by at least one of hydraulic, compressed air, and electricity and the first and second actuator mechanism can be operated by a remote sensor device.

20. A bed assembly according to claim 18 wherein the first and second actuator mechanism can be continuosly operable.

21. A bed assembly according to claim 18 wherein the cradle is a sheet type material having a recess on each side portion said recess extending in a longitudinal direction thereof.

22. A bed assembly according to claim 21 wherein the sheet material is selected from the group consisting of thermoplastic and thermosetting plastics.

23. A bed assembly according to claim 21 wherein the sheet material is a acrylonitrilebutadiene-styrene copolymer.

24. A bed assembly according to claim 18 wherein the cradle is selected from the group consisting of a single continuous sheet and a series of sheet sections adapted to correspond to divided sections of a support frame.

25. A bed assembly according to claim 18 wherein the cradle has a series of slots evenly spaced extending in a direction transverse to the longitudinal axis.

26. A bed assembly according to claim 18 wherein a central portion of the cradle extending in a longitudinal direction is securably attached to the support frame by at least one of screwing to the frame and using a system of hook and loop fasteners.

27. A bed assembly according to claim 18 wherein the cradle further includes a mattress placed thereon.

28. A bed assembly according to claim 18 wherein the cradle support engaging means is a frame structure disposed beneath and extending across said support frame.

29. A bed assembly according to claim 28 wherein the frame structure includes a set of raising arms adapted to be extendable and retractable when said first actuator mechanism acts upon said engaging means.

30. A bed assembly according to claim 29 wherein the raising arms are cantilevered to adopt a first folded position adjacent longitudinal sides of the support frame when retracted and a second position perpendicular to the support surface when extended.

31. A bed assembly according to claim 29 wherein the frame structure further includes a pair of engagement transmission bars positioned on either side of the support frame and coupled to the raising arms to be raised and lowered with extended and retracted movement of the raising arms respectively.

32. A bed assembly according to claim 30 wherein the raising arms and transmission bars are able to be moved in unison.

33. A bed assembly according to claim 18 wherein the support frame is divided into a plurality of sections or plates.

34. A bed assembly according to claim 33 wherein the support frame has at least two sections adapted to be independently slidably or pivotally movable so as to be capable of adopting any number of conventional positions.

35. A bed assembly according to claim 18 wherein the support frame can be pivotally adjusted about a vertical plane passing through its centrally located longitudinal axis.

36. A bed assembly according to claim 18 wherein the base support can be at least one of raised, lowered, and tilted about a vertical axis.

* * * * *